(12) United States Patent
Lin et al.

(10) Patent No.: US 12,490,360 B2
(45) Date of Patent: Dec. 2, 2025

(54) H-BRIDGE DIMMING AND COLOR TEMPERATURE ADJUSTING TWO-LINE OUTPUT CIRCUIT AND LED DIMMING POWER SUPPLY

(71) Applicant: Zhuhai Shengchang Electronics Co., Ltd., Zhuhai (CN)

(72) Inventors: Jianhao Lin, Zhuhai (CN); Dehua Zheng, Zhuhai (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 50 days.

(21) Appl. No.: 18/747,968

(22) Filed: Jun. 19, 2024

(65) Prior Publication Data

US 2025/0159774 A1    May 15, 2025

(30) Foreign Application Priority Data

Nov. 15, 2023   (CN) .......................... 202323088894.8

(51) Int. Cl.
*H05B 45/39* (2020.01)
*H05B 45/10* (2020.01)
*H05B 45/20* (2020.01)

(52) U.S. Cl.
CPC ............. *H05B 45/39* (2020.01); *H05B 45/10* (2020.01); *H05B 45/20* (2020.01)

(58) Field of Classification Search
CPC ......... H05B 45/39; H05B 45/10; H05B 45/20
See application file for complete search history.

(56) References Cited

U.S. PATENT DOCUMENTS

| 10,314,124 B1* | 6/2019 | Yang ...................... H05B 45/20 |
| 10,667,362 B1* | 5/2020 | Coetzee ................ H05B 45/39 |
| 2022/0159806 A1* | 5/2022 | Han ..................... H05B 45/325 |

FOREIGN PATENT DOCUMENTS

| CN | 217883896 U | 11/2022 |
| CN | 219204732 U | 6/2023 |
| CN | 117255443 A | 12/2023 |

* cited by examiner

*Primary Examiner* — Minh Tran
(74) *Attorney, Agent, or Firm* — George D. Morgan (57) ABSTRACT

The present invention discloses an H-bridge dimming and color temperature adjusting two-line output circuit and an LED dimming power supply. The H-bridge dimming and color temperature adjusting two-line output circuit includes a first signal generator U1, a second signal generator U2, a first switch transistor Q1, a second switch transistor Q2, a third switch transistor Q3, and a fourth switch transistor Q4. Through the above structure, it is possible to achieve two-line dimming and color temperature adjustment without distinguishing between positive and negative electrodes. The H-bridge dimming and color temperature adjusting two-line output circuit has the advantages of simple circuit connection, fewer devices, low cost, stable performance, and smooth dimming.

4 Claims, 8 Drawing Sheets

H-BRIDGE DIMMING AND COLOR TEMPERATURE ADJUSTING TWO-LINE OUTPUT CIRCUIT AND LED DIMMING POWER SUPPLY

CROSS-REFERENCE TO RELATED APPLICATIONS

The application claims priority to Chinese patent application No. 2023230888948, filed on Nov. 15, 2023, the entire contents of which are incorporated herein by reference.

TECHNICAL FIELD

The present invention relates to the technical field of LED lighting, in particular to an H-bridge dimming and color temperature adjusting two-line output circuit and an LED dimming power supply.

BACKGROUND

At present, an LED driving power supply and a switch power supply are widely used in the market, with diverse dimming and color temperature adjusting modes, achieve minimum brightness can be achieved and the LED driving power supply and the switch power supply have the advantage of smooth dimming. However, in order to provide better dimming experience, the existing LED driving power supply has adopted very complex circuits, which not only has high manufacturing costs, but also has certain requirements for wiring of lamps. Especially, in the control of dual-color light, a control process is more complex, which further increases the volume of the LED driving power supply and is not conducive to product miniaturization. Therefore, there is an urgent need to develop an H-bridge dimming and color temperature adjusting two-line output circuit and an LED dimming power supply to solve the above problems.

SUMMARY

The present invention aims to at least solve one of technical problems existing in the prior art Therefore, the present invention provides an H-bridge dimming and color temperature adjusting two-line output circuit and an LED dimming power supply.

In order to solve the technical problem, one embodiment of the present invention adopts the technical solution: the H-bridge dimming and color temperature adjusting two-line output circuit includes a first signal generator U1, a second signal generator U2, a first switch transistor Q1, a second switch transistor Q2, a third switch transistor Q3, and a fourth switch transistor Q4, where the first signal generator U1 is connected to a first PWM signal, the second signal generator U2 is connected to a second PWM signal, and duty cycles of the first PWM signal and the second PWM signal are complementary;

a control terminal of the first switch transistor Q1 and a control terminal of the third switch transistor Q3 are connected to the first signal generator U1, and a control terminal of the second switch transistor Q2 and a control terminal of the fourth switch transistor Q4 are connected to the second signal generator U2;

an input terminal of the first switch transistor Q1 and an input terminal of the second switch transistor Q2 are connected to a V+ terminal;

an output terminal of the first switch transistor Q1 is connected to an input terminal of the third switch transistor Q3, a positive electrode of a cold light lamp group, and a negative electrode of a warm light lamp group, respectively, and an output terminal of the second switch transistor Q2 is connected to an input terminal of the fourth switch transistor Q4, a negative electrode of the cold light lamp group, and a positive electrode of the warm light lamp group, respectively; and an output terminal of the third switch transistor Q3 and an output terminal of the fourth switch transistor Q4 are grounded.

Preferably, the H-bridge dimming and color temperature adjusting two-line output circuit further includes current limiting resistors R1 in serial connection to the output terminal of the third switch transistor Q3, the output terminal of the fourth switch transistor Q4 and grounding terminals.

Preferably, the first switch transistor Q1, the second switch transistor Q2, the third switch transistor Q3 and the fourth switch transistor Q4 are MOS transistors.

The LED dimming power supply includes an EMI filtering module, an AC-DC module, and the H-bridge dimming and color temperature adjusting two-line output circuit, where the EMI filtering module is connected between an external power supply and an input terminal of the AC-DC module, the AC-DC module outputs the V+ terminal and a VCC terminal, the first signal generator U1 and/or the second signal generator U2 are/is connected to the VCC terminal, and the input terminal of the first switch transistor Q1 and the input terminal of the second switch transistor Q2 are connected to the V+ terminal.

The H-bridge dimming and color temperature adjusting two-line output circuit and the LED dimming power supply disclosed by the present invention have the beneficial effects that the H-bridge dimming and color temperature adjusting two-line output circuit includes the first signal generator U1, the second signal generator U2, the first switch transistor Q1, the second switch transistor Q2, the third switch transistor Q3, and the fourth switch transistor Q4. Through the above structure, it is possible to achieve two-line dimming and color temperature adjustment without distinguishing between positive and negative electrodes. The H-bridge dimming and color temperature adjusting two-line output circuit has the advantages of simple circuit connection, fewer devices, low cost, stable performance, and smooth dimming.

BRIEF DESCRIPTION OF DRAWINGS

The above and/or additional aspects and advantages of the present invention will become apparent and easy to understand from the description of embodiments in conjunction with the following drawings, where.

DETAILED DESCRIPTION OF THE EMBODIMENTS

This part will describe the specific embodiments of the disclosure in detail. The preferred embodiments of the disclosure are shown in the accompanying drawings, and the function of the drawings is to supplement the description of the text part with graphics, which enables people to intuitively and vividly understand each technical feature and the overall technical solutions of the disclosure, but cannot be understood as limiting the scope of protection of the disclosure.

In the description of the present invention, "a plurality of" means more than two, "greater than a number", "less than a number", "exceed a number" and the like indicate that the number is excluded, and "above a number", "below a number", "within a number", and the like indicate that the number is included. "First" and "second" are intended only for distinguishing between technical features but cannot be used to indicate or imply relative importance or implicitly specify a quantity of indicated technical features or implicitly specify a sequential relationship of indicated technical features.

In the description of the present invention, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the present invention, unless otherwise expressly defined, the terms such as "arranged", "mounted", and "connected" should be understood in a broad sense. For example, it can be directly connected or indirectly connected through intermediate media; it can be in fixed connection, detachable connection, or integrated molding; it can be in mechanical connection; and it can be internal connectivity of two components or the interaction relationship between two components. For persons of ordinary skill in the art, specific meanings of the terms in the disclosure may be appropriately determined with reference to the specific content in the technical solution.

Figure 1A:
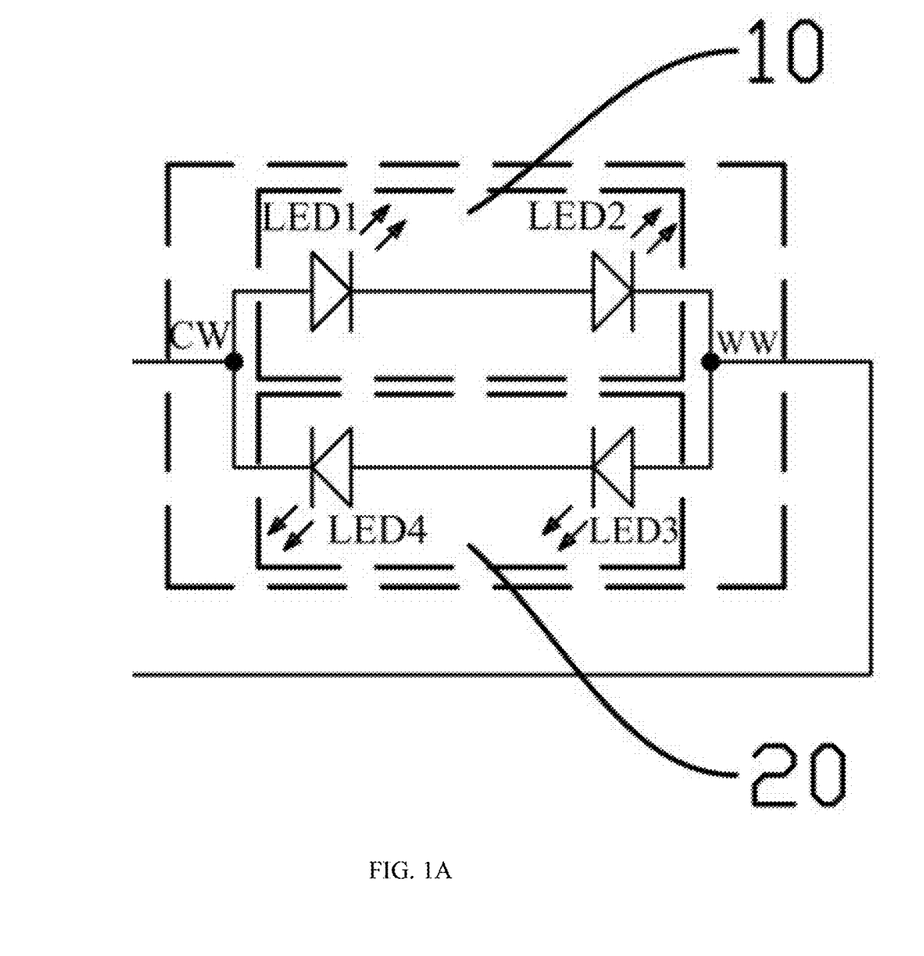
FIGS. 1A, 1B and 1C shows a schematic block diagram of an LED dimming power supply.
Figure 1B:
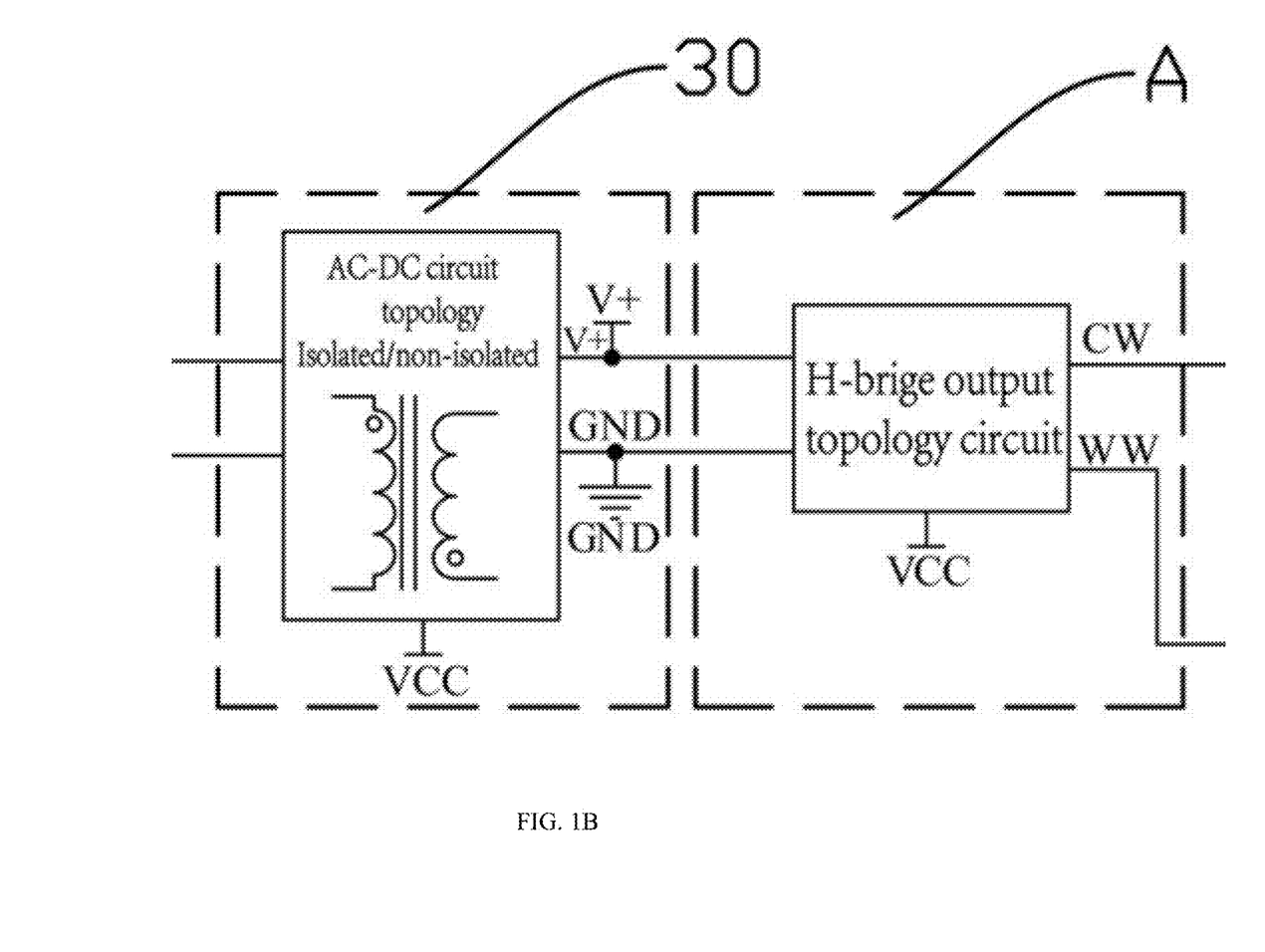
Figure 1C:
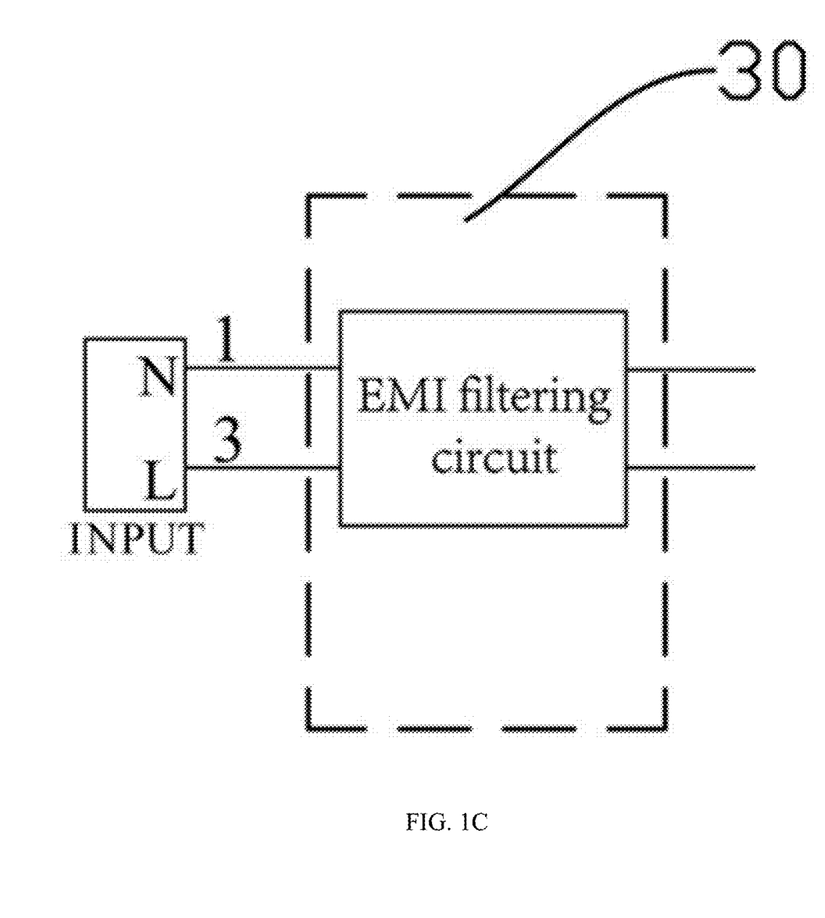
Figure 2A:
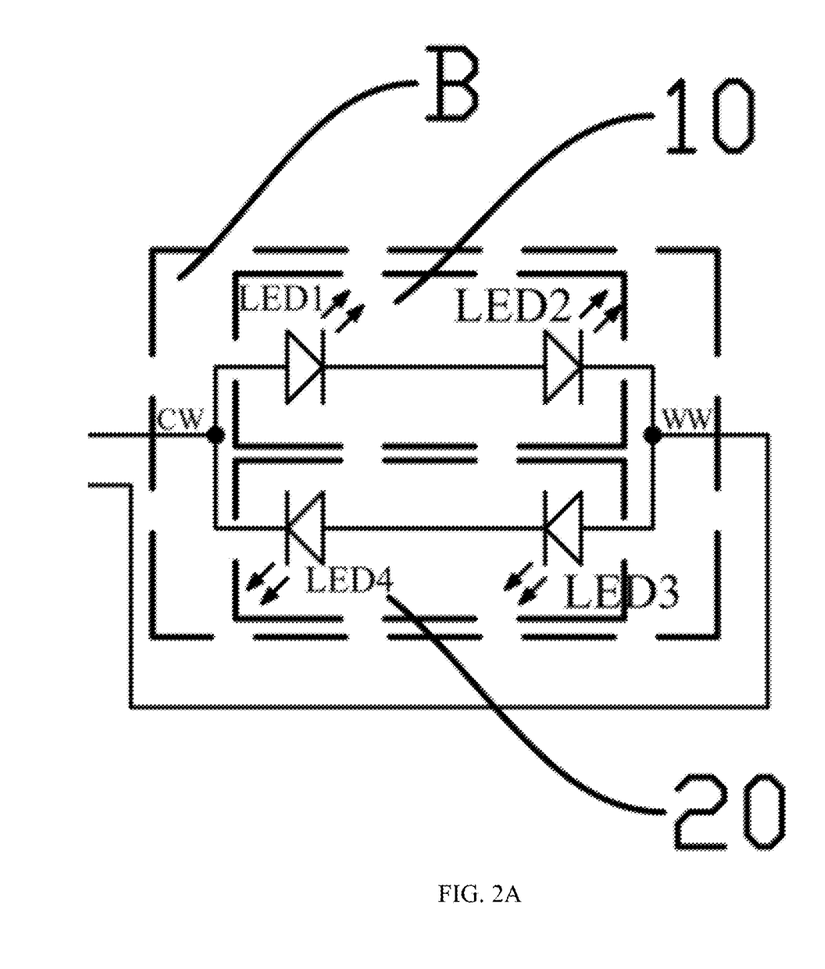
FIGS. 2A, 2B and 2C shows a schematic diagram of a circuit of an LED dimming power supply.
Figure 2B:
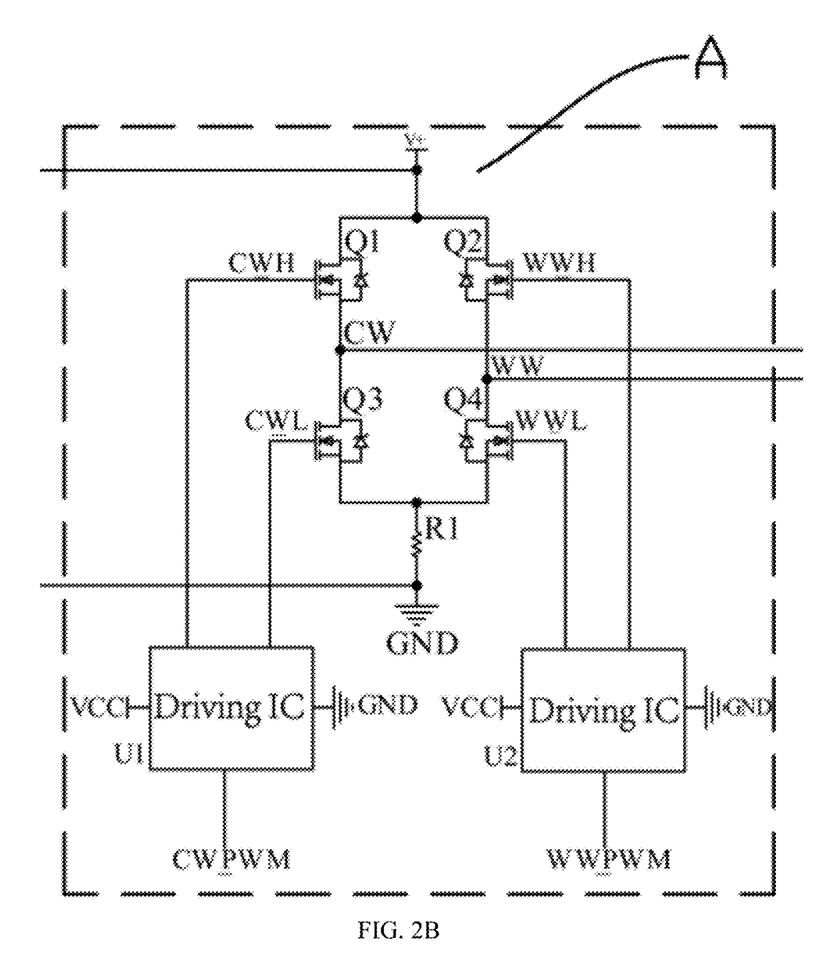
Figure 2C:
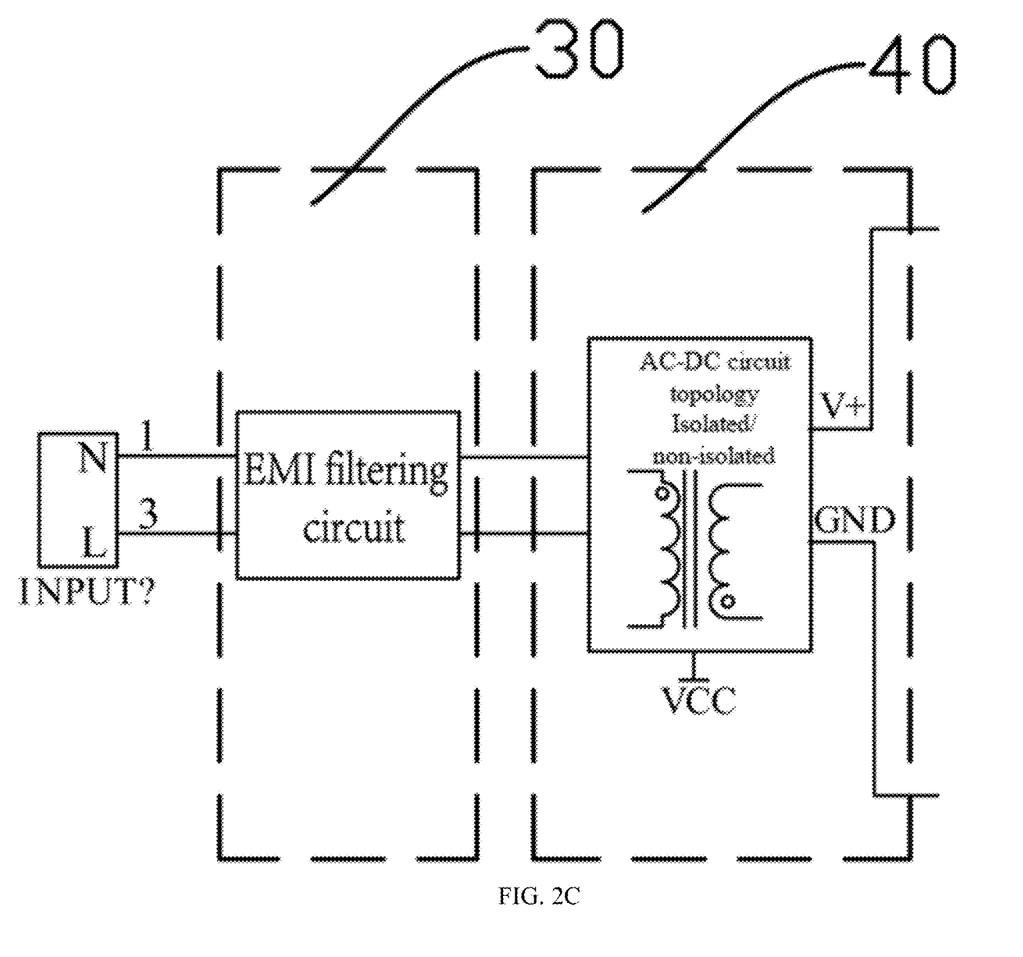
Figure 3:
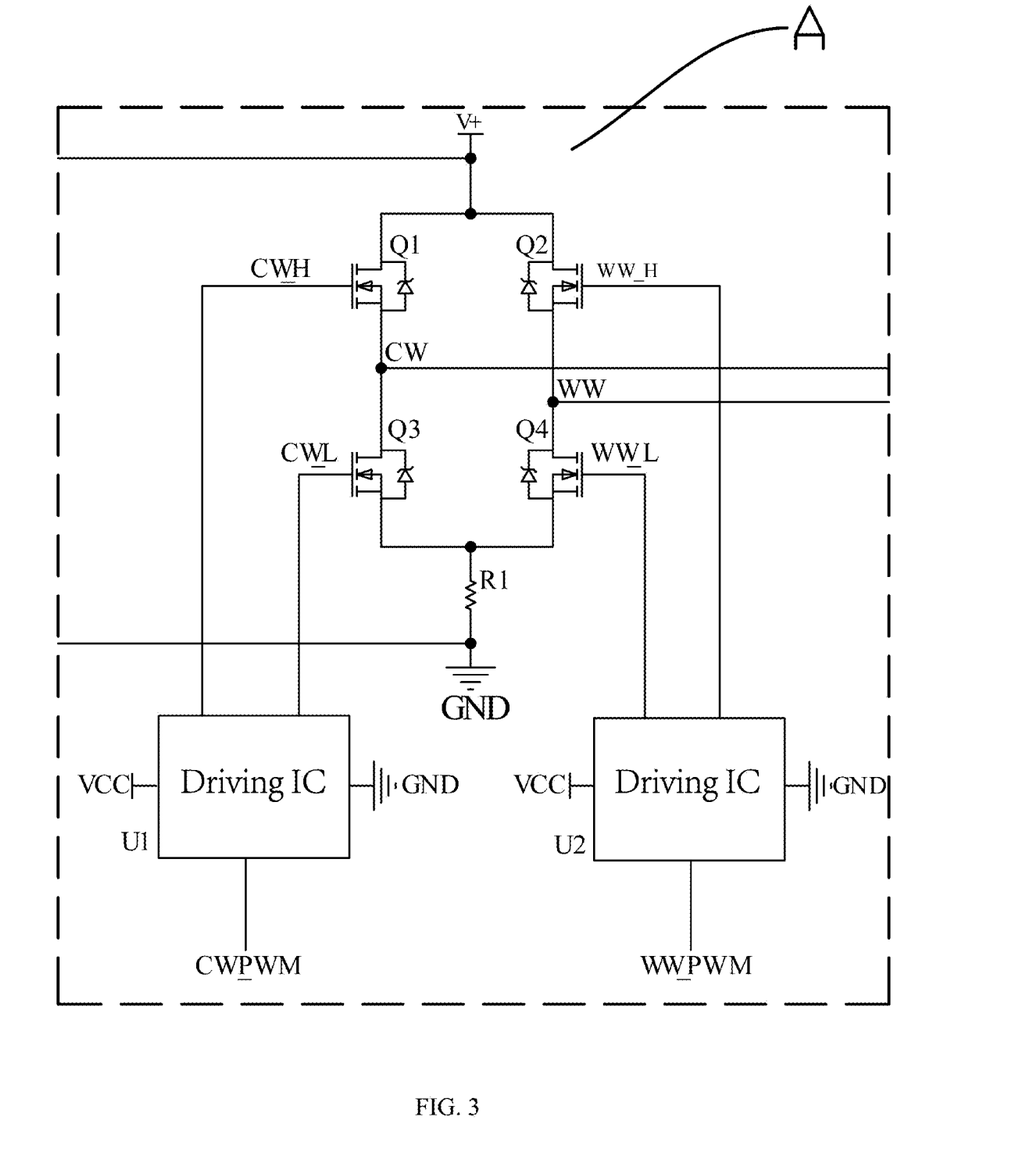
FIG. 3 shows a schematic diagram of a circuit of an H-bridge dimming and color temperature adjusting two-line output circuit.
Figure 4:
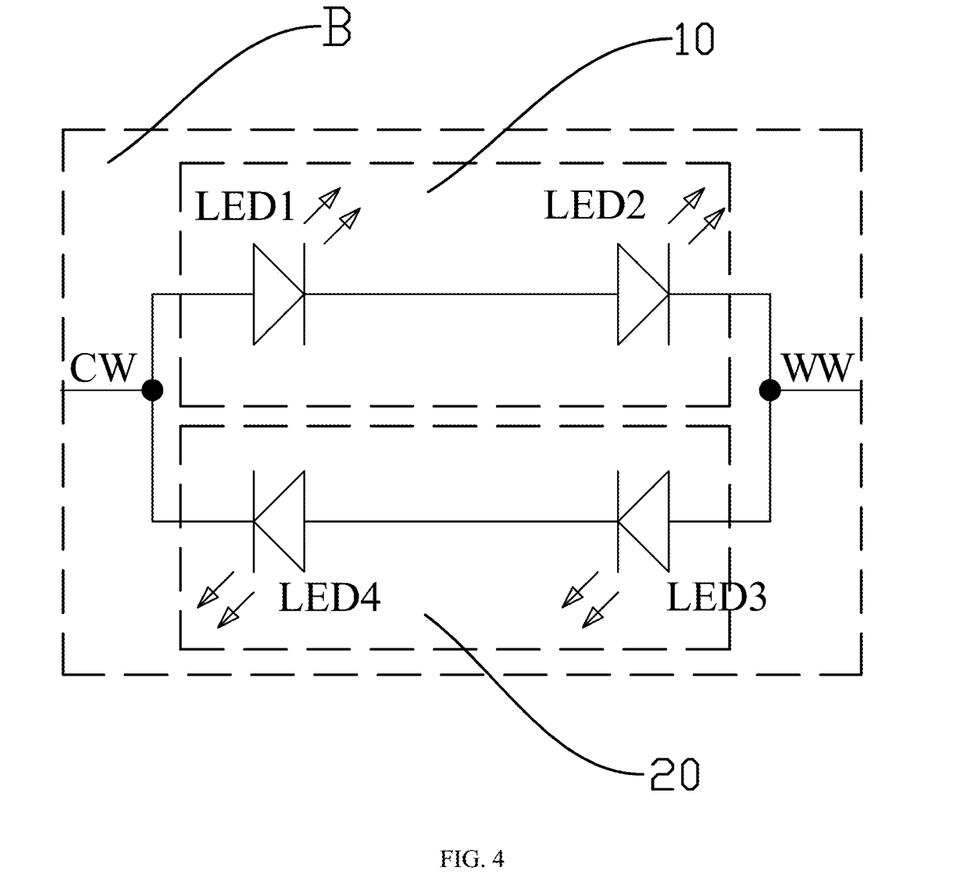
FIG. 4 shows a schematic diagram of a circuit of a cold light lamp group and a warm light lamp group.

Referring to FIGS. 1-4, the H-bridge dimming and color temperature adjusting two-line output circuit includes a first signal generator U1, a second signal generator U2, a first switch transistor Q1, a second switch transistor Q2, a third switch transistor Q3, and a fourth switch transistor Q4, where the first signal generator U1 is connected to a first PWM signal, the second signal generator U2 is connected to a second PWM signal, and duty cycles of the first PWM signal and the second PWM signal are complementary;

a control terminal of the first switch transistor Q1 and a control terminal of the third switch transistor Q3 are connected to the first signal generator U1, and a control terminal of the second switch transistor Q2 and a control terminal of the fourth switch transistor Q4 are connected to the second signal generator U2;

an input terminal of the first switch transistor Q1 and an input terminal of the second switch transistor Q2 are connected to a V+ terminal;

an output terminal of the first switch transistor Q1 is connected to an input terminal of the third switch transistor Q3, a positive electrode of a cold light lamp group 10, and a negative electrode of a warm light lamp group 20, respectively, and an output terminal of the second switch transistor Q2 is connected to an input terminal of the fourth switch transistor Q4, a negative electrode of the cold light lamp group 10, and a positive electrode of the warm light lamp group 20, respectively; and an output terminal of the third switch transistor Q3 and an output terminal of the fourth switch transistor Q4 are grounded.

In the present invention, when a system is powered on, external AC passes through an EMI filtering module 30 and is rectified into DC power through a rectifier bridge. When an AC-DC module 40 operates stably, due to voltage outer loop feedback and a fixed turn ratio of a voltage regulator, voltage stable in output is divided into the V+ terminal and a VCC terminal, respectively; and the first signal generator U1 can be connected to a CW_PWM signal (the first PWM signal), the second signal generator U2 can be connected to a WW_PWM signal (the second PWM signal), and the CW_PWM signal and the WW_PWM signal are complementary in duty cycles.

1. When cold light and warm light are the brightest, CW_PWM and WW_PWM are complementary in the duty cycles, and besides, the VCC terminal supplies power to the first signal generator U1 and the second signal generator U2; when the CW_PWM is high and the WW_PWM is low, CW_H is high, CW_L is low, WW_H is low, and WW_L is high; the V+ terminal passes through the MOS transistor Q1, the lamp CW enters and flows through the cold light lamp group 10, then exits from the lamp WW, passes through MOS transistor Q4, and the current limiting resistor R1, and returns to the GND, and at this time, the lamp is the bright in cold light. When the CW_PWM is low and the WW_PWM is high, CW_H is low, CW_L is high, WW_H is high, and WW_L is low; the V+ terminal passes through an MOS transistor Q2, a lamp WW enters and flows through the warm light lamp group 20, then exits from the lamp CW, passes through an MOS transistor Q3, the current limiting resistor R1, and returns to the GND, and at this time, the lamp is bright in warm light; and the duty cycles are controlled by frequency, and at this time, cold light and warm light are the brightest.

2. When the cold light is the brightest, the CW_PWM is high, the WW_PWM is low, at this time, CW_H is high, CW_L is low, WW_H is low, and WW_L is high; and the V+ terminal passes through the MOS transistor Q1, the lamp CW enters and flows through the cold light lamp group 10, then exits from the lamp WW, passes through MOS transistor Q4, and the current limiting resistor R1, and returns to the GND, and at this time, the lamp is the brightest in cold light.

3. When the warm light is the brightest, the CW_PWM is low, the WW_PWM is high, at this time, CW_H is low, CW_L is high, WW_H is high, and WW_L is low; and the V+ terminal passes through the MOS transistor Q2, the lamp WW enters and flows through the warm light lamp group 20, then exits from the lamp CW, passes through the MOS transistor Q3, the current limiting resistor R1, and returns to the GND, and at this time, the lamp is the brightest in warm light.

4. The present invention has the advantages that through the above structure, it is possible to achieve two-line dimming and color temperature adjustment without distinguishing between positive and negative electrodes. The H-bridge dimming and color temperature adjusting two-line output circuit has the advantages of simple circuit connection, fewer devices, low cost, stable performance, and smooth dimming.

The H-bridge dimming and color temperature adjusting two-line output circuit further includes the current limiting resistor R1 in serial connection to the output terminal of the third switch transistor Q3, the output terminal of the fourth switch transistor Q4 and grounding terminals.

Preferably, the first switch transistor Q1, the second switch transistor Q2, the third switch transistor Q3 and the fourth switch transistor Q4 are MOS transistors.

An LED dimming power supply includes the EMI filtering module 30, the AC-DC module 40, and the H-bridge dimming and color temperature adjusting two-line output circuit according to any one of claims 1-3, where the EMI filtering module 30 is connected between an external power supply and an input terminal of the AC-DC module 40, the AC-DC module 40 outputs the V+ terminal and the VCC terminal, the first signal generator U1 and/or the second signal generator U2 are/is connected to the VCC terminal, and the input terminal of the first switch transistor Q1 and the input terminal of the second switch transistor Q2 are connected to the V+ terminal.

Of course, the present invention is not limited to the above-mentioned implementation. Those skilled in the art may also make equivalent modifications or replacements without violating the spirit of the present invention. These equivalent modifications and replacements all fall within the scope of the claims of the present application.

What is claimed is:

1. An H-bridge dimming and color temperature adjusting two-line output circuit, comprising a first signal generator U1, a second signal generator U2, a first switch transistor Q1, a second switch transistor Q2, a third switch transistor Q3, and a fourth switch transistor Q4, wherein
   the first signal generator U1 is connected to a first PWM signal, the second signal generator U2 is connected to a second PWM signal, and duty cycles of the first PWM signal and the second PWM signal are complementary;
   a control terminal of the first switch transistor Q1 and a control terminal of the third switch transistor Q3 are connected to the first signal generator U1, and a control terminal of the second switch transistor Q2 and a control terminal of the fourth switch transistor Q4 are connected to the second signal generator U2;
   an input terminal of the first switch transistor Q1 and an input terminal of the second switch transistor Q2 are connected to a V+ terminal;
   an output terminal of the first switch transistor Q1 is connected to an input terminal of the third switch transistor Q3, a positive electrode of a cold light lamp group (10), and a negative electrode of a warm light lamp group (20), respectively, and an output terminal of the second switch transistor Q2 is connected to an input terminal of the fourth switch transistor Q4, a negative electrode of the cold light lamp group (10), and a positive electrode of the warm light lamp group (20), respectively; and
   an output terminal of the third switch transistor Q3 and an output terminal of the fourth switch transistor Q4 are grounded.

2. The H-bridge dimming and color temperature adjusting two-line output circuit according to claim 1, further comprising current limiting resistors R1 in serial connection to the output terminal of the third switch transistor Q3, the output terminal of the fourth switch transistor Q4 and grounding terminals.

3. The H-bridge dimming and color temperature adjusting two-line output circuit according to claim 1, wherein the first switch transistor Q1, the second switch transistor Q2, the third switch transistor Q3 and the fourth switch transistor Q4 are MOS transistors.

4. An LED dimming power supply, comprising an EMI filtering module (30), an AC-DC module (40), and the H-bridge dimming and color temperature adjusting two-line output circuit according to claim 1, wherein the EMI filtering module (30) is connected between an external power supply and an input terminal of the AC-DC module (40), the AC-DC module (40) outputs the V+ terminal and a VCC terminal, the first signal generator U1 and/or the second signal generator U2 are/is connected to the VCC terminal, and the input terminal of the first switch transistor Q1 and the input terminal of the second switch transistor Q2 are connected to the V+ terminal.

* * * * *